Figure 1:
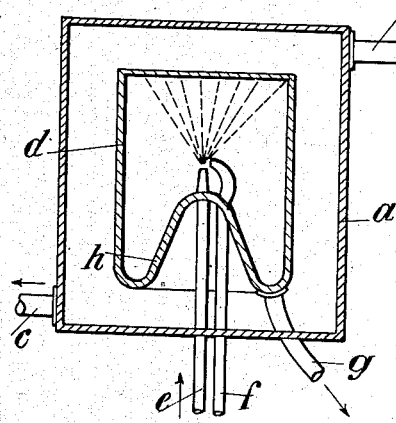

O. LOBECK.
APPARATUS FOR STERILIZING MILK AND OTHER LIQUIDS.
APPLICATION FILED OCT. 11, 1913.

1,174,592.

Patented Mar. 7, 1916.
2 SHEETS—SHEET 1.

WITNESSES:
F. Hogg.
G. Love.

INVENTOR
Oskar Lobeck,
BY Carl P. Goepel.
ATTORNEY

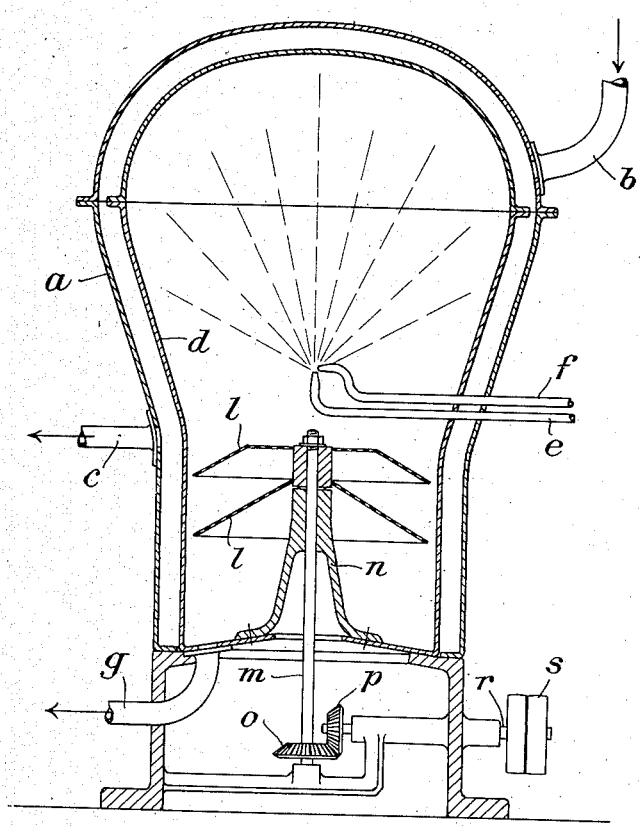

UNITED STATES PATENT OFFICE.

OSKAR LOBECK, OF LEIPZIG, GERMANY.

APPARATUS FOR STERILIZING MILK AND OTHER LIQUIDS.

1,174,592.  Specification of Letters Patent.  Patented Mar. 7, 1916.

Application filed October 11, 1913. Serial No. 794,622.

*To all whom it may concern:*

Be it known that I, OSKAR LOBECK, a citizen of the German Empire, and residing at Leipzig, Germany, have invented certain new and useful Improvements in an Apparatus for Sterilizing Milk and other Liquids, of which the following is a specification.

The present invention relates to an apparatus for the sterilization of finely atomized milk and other liquids, in which the atomized milk or liquid is indirectly heated to the temperature necessary for sterilization, whereby a portion of the milk or other liquid to be sterilized is exposed to pressure and serves for atomizing the other part.

The apparatus employed for carrying this process into practice consists of an internal atomizing chamber and of an outer heating jacket to which an appropriate heating medium is supplied. A nozzle opens into the atomizing chamber and serves for atomizing the milk.

The apparatus of the prior art presents the defect that the atomized milk particles cannot be exposed to a uniform temperature. In particular the cone of spray from the atomizing nozzle causes the formation of a zone in which it is impossible for heat to penetrate, so that a large portion of the milk mist dropping from this cone of spray is not exposed to the temperature that has been produced in the atomizing chamber by indirectly heating it, or is only exposed to such temperature incompletely. Accordingly only the particles of milk that reach the heating zone are actually sterilized. In accordance with the present invention this defect is avoided by constructing the apparatus in such a manner that the particles of liquid falling from the spraying cone of the nozzle are also exposed with certainty to the sterilization temperature. With this object either the form of the inner atomizing chamber is selected in such a manner that the dropping particles of milk fall in a proper heating zone or upon a heated surface and this result can be attained by providing inclined surfaces or by forming the bottom of the atomizing chamber dome shaped, conical or the like or rotatable bodies can be mounted in the atomizing chamber for conducting the falling particles of milk into a heated zone, for example into a zone in proximity to the heated wall or directly onto this wall. These surfaces or bodies may be made of metal or any equivalent material. In this connection it is the practice in apparatus for heating and evaporating liquids to make the heating and impact surface rotatable and the atomizing chamber has likewise been provided with inclined surfaces in apparatus for treating atomized liquids. As compared therewith, the rotary or movable bodies inserted in the chamber in accordance with the present invention serve the purpose of conducting the milk or other liquid from the atomizing zone into heated zones and thereby render the sterilization certain, and the inclined surfaces (which is known apparatus merely serve as collecting surfaces) serve for heating the atomized particles of milk to the sterilization temperature.

Figure 2:
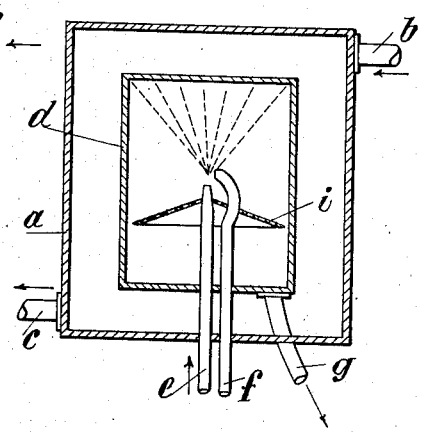
Figure 3:
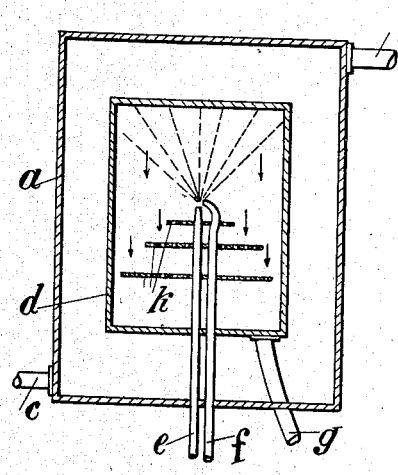
Figure 4:
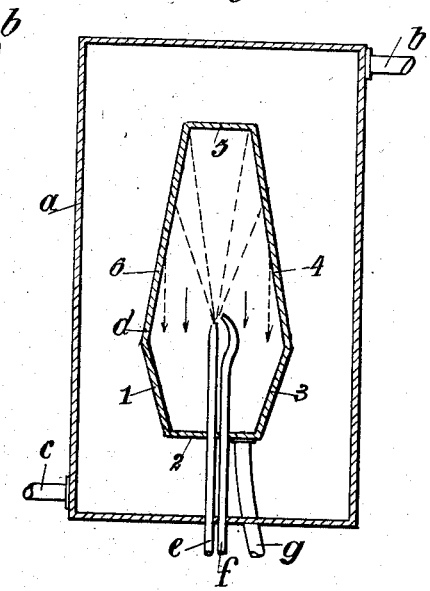

Several embodiments of the invention are illustrated in the drawings in which:

Figure 1 is a vertical section of a sterilizing apparatus with atomizing chamber presenting a dome-shaped bottom. Fig. 2 is a vertical section of a sterilizing apparatus with roof-like sieves in the atomizing chamber. Fig. 3 illustrates a construction with a plurality of inserted bodies. Fig. 4 shows diagrammatically variously shaped atomizing chambers. Fig. 5 illustrates a construction in which the atomized milk is allowed to fall upon revolving metallic surfaces.

In the embodiment of the invention illustrated in Fig. 1, $a$ is the jacket of the heating chamber to which the heating medium of any appropriate kind is conducted through the pipe $b$, the discharge from this jacket is through the pipe $c$. $d$ is the atomizing chamber which is indirectly heated by the heating medium flowing through the heating jacket $a$. The milk or other liquid to be atomized is conducted through the pipe $f$ and a part of the milk or the like under pressure is conducted through the pipe $e$, so that the desired atomizing of the milk inside the chamber $d$ is produced. At $h$ the bottom of the atomizing chamber is domed inward, so that the space inclosed by the dome or cone whose surface extends far into the atomizing chamber exactly at its center, is exposed to the action of the heating medium. By the action of the nozzle, which of course may vary in form, a portion of the atomized milk or the like is forced into the heating zone and there exposed to sterilization temperature. These particles of milk that fall from the spraying cone of the nozzle without reaching the heating zone proper, fall onto the head surface of the dome or cone shaped bottom $h$, trickle down this and are thus uniformly and adequately exposed to the sterilizing temperature. The milk or the like which is thus completely sterilized flows off through the pipe $g$ and may at once be cooled if desired.

An effect similar to that obtainable with the dome or cone shaped bottom is attainable when the atomizing chamber itself presents a form adapted to the spraying cone, for example when the atomizing chamber is provided with oblique and heated surfaces in such a manner that the particles of milk dropping from the spraying cone reach these surfaces on which they are exposed to the sterilizing temperature. A construction of this kind is illustrated in Fig. 4 diagrammatically. The atomizing chamber *d* is composed of the surfaces 1, 2, 3, 4, 5 and 6 and the inclined surfaces 1 or 3 are presented to the direction of fall of the particles of milk dropping from the spraying cone and upon these surfaces the falling particles drop and are there exposed to a sufficient extent to the sterilizing temperature. The upper part of the sterilizing chamber can, however, differ in shape to any desired degree. It is, however, advantageous in this case also to arrange the surfaces obliquely to the vertical direction of fall of the descending milk particles in order to cause them in any case to reach heated surfaces so that they are exposed with certainty to the sterilizing temperature.

In the embodiment of the invention illustrated in Fig. 2 which in the general arrangement of the apparatus corresponds to Fig. 1, some suitable member, preferably a roof shaped sieve member *i* is arranged in the atomizing chamber *d* at an appropriate height above the bottom of the atomizing chamber. The particles of milk falling from the spraying cone reach this sieve, where they unite into drops which then fall on the edge of the sieve either in immediate proximity to the heated wall or are conducted onto this wall, trickle down it and are thus uniformly exposed to the sterilizing temperature to a sufficient extent. The form of these members to be inserted in the heating chamber and also their construction can of course vary as desired.

The arrangement illustrated in Fig. 3 is very advantageous. Here bodies such as plates, walls, sieves and the like are superposed in tiers. The particles of milk dropping from the spraying cone thus reach the several bodies and pass from one to the other, so that they occupy a relatively long time in passing through the heated atomizing chamber and are exposed to the sterilization temperature for a sufficient time. Tiers of coarse meshed sieves have proved to be particularly advantageous for this purpose as the individual milk particles condense thereon and in falling from one sieve to another are maintained in space for an appreciable time before they contact with the next heated plate. These inserted bodies of whatever shape and arrangement can be given any desired movement, for example a rotary movement, for the purpose of continuing the displacement of the milk particles falling thereon and forcing them into the heating zone. Such an embodiment is shown in Fig. 5 in which an outer wall *a* surrounds an inner wall *d*. The heating medium is led thereto by pipe *b*, and flows away through pipe *c*. The wall *d* incloses the atomizing chamber. The fluid to be sterilized is led to the atomizing chamber through the pipe *e*, and the atomizing medium through pipe *f*. The sterilized fluid is led away through pipe *g*. The atomizing or other division of the fluid can naturally proceed by any desired means. The peculiarity of this embodiment consists in having the sieve-like plates, built into the atomizing chamber, fastened on a shaft *m*, which is revoluble in a journal *n*, fastened to the bottom of the atomizing chamber, and which are set into revolution by means of the toothed wheels *o* and *p*, or by another form of drive, by means of the pulley *s*, fastened on the shaft *r*, so that, by means of the revoluble arrangement of the disk or the plate *l*, the falling and atomized fluid will be outwardly driven by the working of the centrifugal force, and will reach the inner heated wall *d*, and trickles down it, whereby it is exposed to the working of the sterilizing temperature in an extremely thin layer. The purpose of this embodiment is the same as that of the other embodiments. The means for driving the shaft carrying the disks may be of any kind desired without changing the essence of the invention.

I claim:

1. An apparatus for sterilizing milk and other liquids, comprising a heated chamber, a supply pipe for supplying a jet of liquid to the chamber, an atomizing pipe for atomizing and spraying the entering jet of liquid, a discharge pipe for carrying away the sterilized liquid from said chamber, said apparatus comprising a heating surface intermediate the mouth of said supply pipe and the mouth of said discharge pipe, over which heating surface sprayed particles of liquid pass before reaching the said mouth of said discharge pipe.

2. An apparatus for sterilizing milk and other liquids, comprising a heated chamber, a supply pipe for supplying a jet of liquid to the chamber, an atomizing pipe for atomizing and spraying the entering jet of liquid, a discharge pipe for carrying away the sterilized liquid from said chamber, said apparatus comprising a heating surface intermediate the mouth of said supply pipe and the mouth of said discharge pipe, over which heating surface sprayed particles of liquid pass before reaching the said mouth of said discharge pipe, said heating surfaces being inclined with respect to said discharge pipe.

3. An apparatus for sterilizing milk and other liquids, comprising a heated chamber, a supply pipe for supplying a jet of liquid to the chamber, an atomizing pipe for atomizing and spraying the entering jet of liquid, a discharge pipe for carrying away the sterilized liquid from said chamber, said apparatus comprising a metallic surface intermediate the mouth of said supply pipe and the mouth of said discharge pipe, over which metallic surface sprayed particles of liquid pass before reaching the said mouth of said discharge pipe, and means for revolving said metallic surfaces.

4. An apparatus for sterilizing milk and other liquids, comprising a heated chamber, an upwardly directed supply pipe for supplying a jet of liquid to the chamber, an atomizing pipe for atomizing and spraying the entering jet of liquid, a discharge pipe having its mouth located below the mouth of said supply pipe for carrying away the sterilized liquid from said chamber, said apparatus comprising a heating surface intermediate the mouth of said supply pipe and the mouth of said discharge pipe, over which heating surface sprayed particles of liquid pass before reaching the said mouth of said discharge pipe.

In testimony, that I claim the foregoing as my invention, I have signed my name in presence of two subscribing witnesses.

OSKAR LOBECK.

Witnesses:
 ERNST EISENACH,
 PAUL RAABSKI.